US011311821B2

(12) United States Patent
Tamura et al.

(10) Patent No.: US 11,311,821 B2
(45) Date of Patent: Apr. 26, 2022

(54) DEGASSING APPARATUS FOR REMOVING DISSOLVED GAS FROM LIQUIDS

(71) Applicants: Minoru Tamura, Tokushima (JP); Yasuaki Tamura, Tokushima (JP)

(72) Inventors: Minoru Tamura, Tokushima (JP); Yasuaki Tamura, Tokushima (JP)

(73) Assignees: Minoru Tamura, Tokushima (JP); Yasuaki Tamura, Tokushima (JP)

( * ) Notice: Subject to any disclaimer, the term of this patent is extended or adjusted under 35 U.S.C. 154(b) by 395 days.

(21) Appl. No.: 16/464,851

(22) PCT Filed: Nov. 2, 2017

(86) PCT No.: PCT/JP2017/039767
§ 371 (c)(1),
(2) Date: May 29, 2019

(87) PCT Pub. No.: WO2018/100970
PCT Pub. Date: Jun. 7, 2018

(65) Prior Publication Data
US 2019/0321755 A1    Oct. 24, 2019

(30) Foreign Application Priority Data
Nov. 29, 2016  (JP) .............................. JP2016-231576

(51) Int. Cl.
*B01D 19/00*  (2006.01)
*C02F 1/20*  (2006.01)

(52) U.S. Cl.
CPC ............ *B01D 19/0047* (2013.01); *C02F 1/20* (2013.01)

(58) Field of Classification Search
None
See application file for complete search history.

(56) References Cited

U.S. PATENT DOCUMENTS 3,574,987 A * 4/1971 Skoli .................. B01D 19/0021
96/199
4,316,725 A * 2/1982 Hovind ..................... C02F 1/20
95/248

(Continued)

FOREIGN PATENT DOCUMENTS

JP    09-299709    11/1997
JP    2000-189708    7/2000

(Continued)

OTHER PUBLICATIONS

International Search Report dated Nov. 28, 2017 in International (PCT) Application No. PCT/JP2017/039767.

*Primary Examiner* — Christopher P Jones
*Assistant Examiner* — Phillip Y Shao
(74) *Attorney, Agent, or Firm* — Wenderoth, Lind & Ponack, L.L.P.

(57) ABSTRACT

The degassing apparatus removes liquid from a vacuum tank (1) with a suction pump (6) and supplies that liquid to a storage tank (9), sprays storage tank liquid into the vacuum tank through a convergent nozzle (7), removes gas from liquid in a state of reduced pressure inside the vacuum tank, and stores the degassed liquid in the storage tank. The storage tank is an airtight hermetically sealed tank provided with a reduced pressure retaining valve that discharges gas accumulated inside the storage tank.

13 Claims, 6 Drawing Sheets

(56) References Cited

U.S. PATENT DOCUMENTS

| | | | | |
|---|---|---|---|---|
| 4,411,673 A | * | 10/1983 | Jones | E21B 21/067 |
| | | | | 95/24 |
| 5,234,480 A | * | 8/1993 | Henricson | D21D 5/26 |
| | | | | 162/56 |
| 2006/0144241 A1 | | 7/2006 | Fukagawa et al. | |

FOREIGN PATENT DOCUMENTS

| | | |
|---|---|---|
| JP | 2002-239303 | 8/2002 |
| JP | WO2004/071635 | 8/2004 |
| JP | 2010-149074 | 7/2010 |

\* cited by examiner

DEGASSING APPARATUS FOR REMOVING DISSOLVED GAS FROM LIQUIDS

CROSS-REFERENCE TO RELATED APPLICATION

The present application claims priority under 35 U.S.C. § 119 to Japanese Patent Application No. 2016-231576, filed on Nov. 29, 2016, the content of which is hereby incorporated by reference in their entirety.

BACKGROUND OF THE INVENTION

1. Field of the Invention

The present invention relates to a degassing apparatus for removing gasses such as oxygen, carbon dioxide, and nitrogen contained in liquids.

2. Description of the Related Art

It has been shown that degassed liquids have exceptional characteristics. For example, degassed water has been used effectively in food processing, boiler applications, and as a strategy against rusty water in (building) water systems. When degassed water is used in processing foods and drinks such as fruit juices, soft drinks, and soups, it is extremely effective in preventing oxidation and maintaining freshness. For this reason, degassed water can reduce the use of food additives such as preservatives and stabilizers, or can achieve "non-additive" (natural) foods. It also has the effect that amino acids, which act as essential flavor components, are not allowed to oxidize. Because amino acid oxidation reduces flavor, current practice relies on additives such as monosodium glutamate and coloring to improve taste and establish an appetizing color. Further, when degassed liquids are used to process foods such as frozen foods and tofu (soybean curd), quality is improved due to effective prevention of oxidation. In tofu production, this results in yield improvement and reduced cost. It has also been reported that onigiri (rice molded into an edible shape; e.g. triangular) made of rice steamed with degassed liquid can be preserved for approximately a month without preservative addition.

When degassed liquid is used for the water in boiler applications, boiler rust can be effectively prevented. On average, tap water contains 8 ppm dissolved oxygen. Oxygen dissolved in water oxidizes metals and is the cause of (red/brown) rust. By reducing boiler water dissolved oxygen below 1 ppm, oxidation due to dissolved oxygen can be prevented and boiler life can be extended.

Degassed liquids also serve as an effective strategy to avoid rusty (rust colored) water in building water systems. When degassed liquid is supplied to the elevated water tank of a building with a severe rusty water problem, the rust color is eliminated in several days. Further, liquids that have been degassed have oxidation-reduction power that can make foods such as rice and miso (soybean paste) soup more tasteful. There is also a health benefit obtained by drinking degassed liquids.

Presently, instant foods that can be eaten at any time with little preparation have become numerous. However, these types of food products are primarily stored for significant time periods by methods such as refrigeration or deep freezing, and consequently many of those products oxidize over time. Because oxidized foods are unsavory, additives such as heavy seasoning and preservatives are incorporated in large quantities, and this makes it extremely difficult to produce food products beneficial to the human body. It has also been reported that oxidized foods are the cause of various ailments.

Apparatus with hollow fiber membranes are used to produce degassed liquids exhibiting the outstanding properties described above. These degassing apparatus have a hollow fiber membrane disposed inside an airtight tank, and that hollow fiber membrane passes gas but does not pass liquid. Liquid on one side of the hollow fiber membrane is degassed by evacuating gas from the airtight tank on the other side of the hollow fiber membrane via a vacuum pump. Since degassing is accomplished by removing air inside the airtight tank with a vacuum pump, this type of degassing apparatus cannot efficiently degas liquid. This is because the vacuum pump discharges air inside the reduced pressure airtight tank, and gas must pass through the hollow fiber membrane to degas the liquid. To resolve these problems, the present applicant (inventor) developed a degassing apparatus using a liquid pump. (Refer to Japanese Laid-Open Patent Publication 2000-189708.)

The degassing apparatus shown in FIG. 1 is provided with vacuum tanks 1, a suction pump 6 having its suction-side connected to the vacuum tanks 1 to withdraw liquid and reduce vacuum tank 1 pressure, and convergent nozzles 7 to supply liquid into the vacuum tanks 1 while maintaining reduced vacuum tank pressure established by removing liquid with the suction pump 6.

The degassing apparatus described above establishes reduced pressure inside a vacuum tank 1 by removing liquid with the suction pump 6, supplies liquid to the vacuum tank 1 through a convergent nozzle 7 while maintaining reduced vacuum tank 1 pressure, and degases liquid by separating gas and liquid in the vacuum tank 1. Specifically, this degassing apparatus does not reduce pressure in the vacuum tank 1 with a vacuum pump, but rather the vacuum tank 1 is kept in a state of reduced pressure by withdrawing liquid with the suction pump 6, and liquid is supplied to the vacuum tank 1 through the convergent nozzle 7 while maintaining reduced pressure to degas the liquid.

The degassing apparatus described above has the feature that degassed liquid can be produced efficiently. This is because a liquid suction pump is used instead of a vacuum pump to suck liquid from the vacuum tank and establish reduced pressure, liquid is supplied to the reduced pressure vacuum tank through a convergent nozzle, and gas included in liquid inside the reduced pressure vacuum tank is removed (comes out of solution) to degas the liquid. In particular, this apparatus degases liquid by withdrawing liquid from the vacuum tank with the suction pump to keep the vacuum tank in a reduced pressure state and by supplying liquid through the convergent nozzle while maintaining reduced vacuum tank pressure. Accordingly, compared to degassing apparatus that use hollow fiber membranes, this apparatus can effectively degas liquids such as juices and soups that, due to clogging, cannot be degassed using a hollow fiber membrane. It can also effectively degas extremely high temperature liquids that cannot be degassed using a plastic hollow fiber membrane that can melt.

While the degassing apparatus in FIG. 1 initially developed by the present applicant realizes the superior features cited above, it has the drawback that degassed liquid is held in a storage tank and the dissolved gas content of that liquid increases with storage time. This is because the storage tank is an open tank with the liquid level set by operation of the suction pump, which supplies vacuum tank liquid to the storage tank.

To reduce the contact of air with liquid, the storage tank in FIG. 1 has a cover plate disposed on the surface of the liquid. However, since the cover plate moves up and down with the surface of the liquid, the periphery of the cover plate cannot be fixed to the storage tank in a completely airtight configuration. Accordingly, air passes through gaps between the cover plate and the storage tank, and air contact with the liquid cannot be effectively prevented. As a result, a storage tank with this configuration has the drawback that the amount of gas dissolved in degassed liquid held in the storage tank gradually increases and liquid cannot be maintained in an ideal degassed state.

It is one object of the present invention to provide a degassing apparatus that can efficiently produce degassed liquid with a simple system, can retain liquid in a storage tank in a degassed state for an extended period, and can consistently supply degassed liquid "on-demand."

SUMMARY

The degassing apparatus of the present invention is provided with vacuum tanks 1 (or a single vacuum tank 1), a suction pump 6 connected to the vacuum tanks 1 that withdraws liquid and reduces vacuum tank 1 pressure, a storage tank 9 connected to the vacuum tanks 1 via the suction pump 6 and supplied with liquid from the vacuum tanks 1, and convergent nozzles 7 connected to the storage tank 9 that spray storage tank 9 liquid into each vacuum tank 1 while maintaining reduced pressure inside the vacuum tank 1. In this degassing apparatus, liquid is degassed inside a vacuum tank that has its internal pressure reduced by the suction pump, degassed liquid is supplied to the storage tank, degassed liquid inside the storage tank is supplied to a vacuum tank through a convergent nozzle, and liquid is circulated between the storage tank and vacuum tanks. Further, the storage tank of this degassing apparatus is a hermetically sealed tank provided with a reduced pressure retaining valve 33 that can discharge gas accumulated inside the storage tank and maintain a reduced pressure condition.

The degassing apparatus described above has the characteristic that it can retain liquid in a degassed state for extended periods in the storage tank and can supply degassed liquid at any time while efficiently producing that degassed liquid with a simple system configuration. This is because this degassing apparatus employs a hermetically sealed tank as the storage tank for holding degassed liquid, and the influx of outside air can be prevented to maintain a state of reduced pressure inside the storage tank.

DESCRIPTION

The following describes embodiments of the present invention based on the figures. However, the following embodiments are merely specific examples of the degassing apparatus representative of the technology associated with the present invention, and the degassing apparatus of the present invention is not limited to the embodiments described below.

Further, in this patent application, alphanumeric labels (reference signs) are assigned to components of the embodiments to make the patent claims more easily understood, and those labels are also appended to components described in the "Summary" section. However, components described in the patent claims are in no way limited to components identified in the embodiments.

The following describes in concrete detail an apparatus and method of removing gas from water to produce degassed liquid. However, the degassing apparatus of the present invention can degas liquids other than water. For example the degassing apparatus of the present invention can also degas liquids such as juices and soups that contain organic matter, liquids that contain micro-particles, or viscous liquids such as oils. In particular, since the degassing apparatus of the present invention does not employ a hollow fiber membrane, it can effectively degas viscous liquids such as oil, extremely high temperature liquids, and liquids that contain material such as organic matter. This is because a suction pump reduces pressure in the system and the convergent nozzles supply liquid in a manner that maintains a state of reduced pressure to degas liquid without using a hollow fiber membrane.

Figure 1:
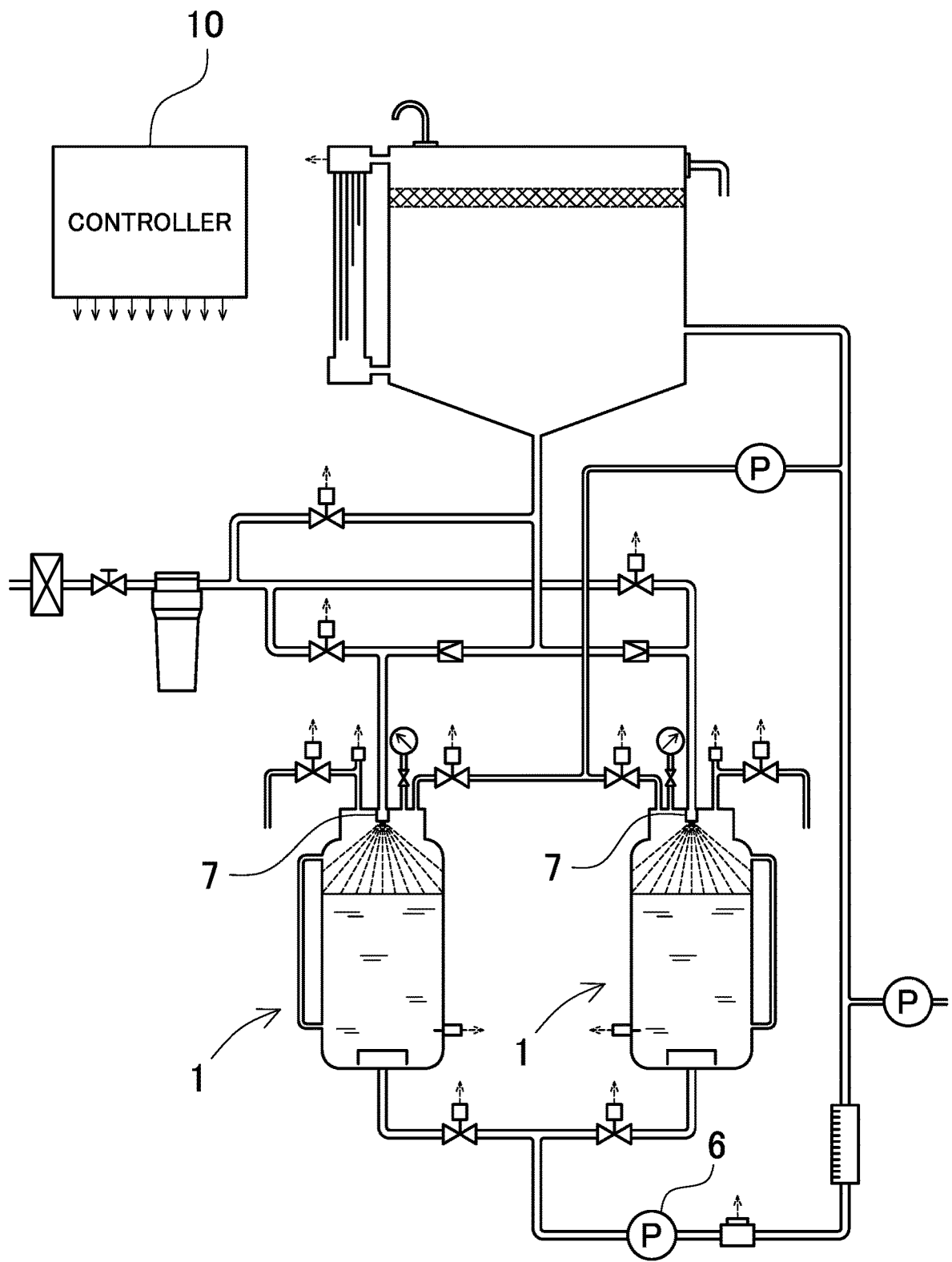
FIG. 1 is a schematic diagram partially in cross-section showing the degassing apparatus initially developed by the present applicant.
Figure 2:
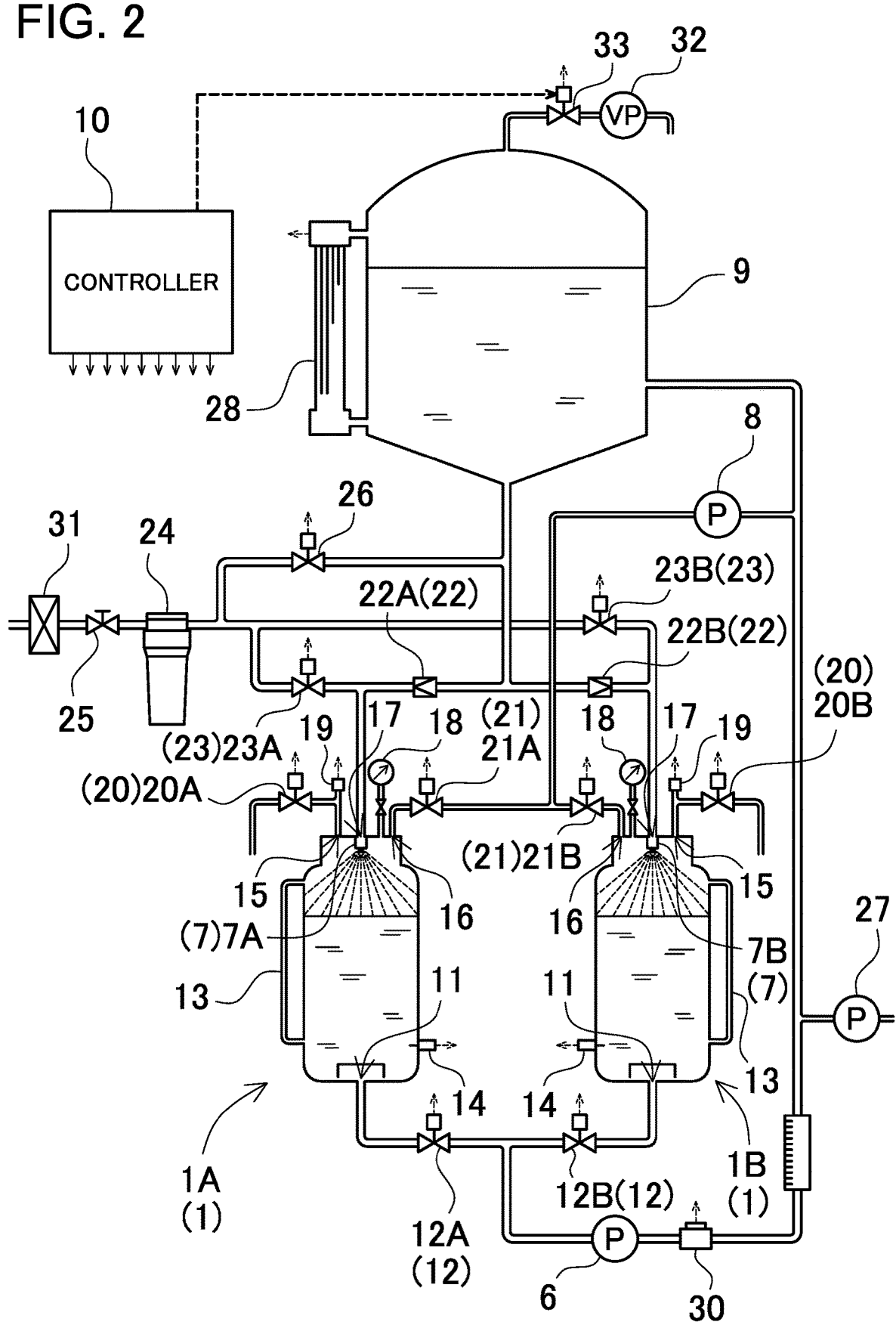
FIG. 2 is a schematic diagram partially in cross-section showing a degassing apparatus for one embodiment of the present invention.

The degassing apparatus for removing dissolved gas constituents from liquids shown in FIG. 2 is provided with vacuum tanks 1 that degas water supplied to the tanks, a suction pump 6 having its suction-side connected to the vacuum tanks 1 to withdraw liquid and establish a state of reduced pressure, convergent nozzles 7 to supply water to the vacuum tanks 1 while maintaining the state of reduced pressure established by removing liquid with the suction pump 6, a liquid supply mechanism 8 that supplies water to the vacuum tanks 1 to discharge accumulated gas, and a controller 10 to control components such as the suction pump 6 and the liquid supply mechanism 8.

The degassing apparatus in FIG. 2 is provided with two vacuum tanks 1 that operate alternately to continuously degas water. Each of the two vacuum tanks 1 has an outlet opening 11 at the bottom for removing water. Each outlet opening 11 is connected to the suction-side of the suction pump 6 through an outlet valve 12. In addition, each vacuum tank 1 has a liquid level gage 13 that allows external verification of the liquid level in the tank. The liquid level gage 13 in the figures is a clear cylinder with upper and lower ends connected to the vacuum tank 1. Liquid level in the clear cylinder rises to the same level as the surface of liquid in the vacuum tank 1 and indicates the level of liquid inside the tank. Also a liquid surface sensor 14 that electrically detects a liquid surface is provided at the bottom of each vacuum tank 1. Each liquid surface sensor 14 is connected to the controller 10 and transmits liquid surface level signals to the controller 10.

The upper end of each vacuum tank 1 is provided with a gas discharge opening 15 to discharge accumulated gas, a liquid supply opening 16 to supply degassed liquid during degassing, an inlet opening 17 connected to the convergent nozzle 7, and a vacuum gage 18 to indicate the degree of vacuum in the tank. The gas discharge opening 15 is connected with a gas discharge valve 20 and an intervening liquid sensor 19. When gas is completely discharged from the vacuum tank 1, the liquid sensor 19 detects the discharge of liquid from the gas discharge opening 15 and supply of degassed liquid is suspended. The liquid supply opening 16 is connected to the liquid supply mechanism 8 through a liquid supply valve 21.

Each inlet opening 17 has a convergent nozzle 7. In the apparatus of the figures, convergent nozzles 7 are spray nozzles. A spray nozzle sprays water into a vacuum tank 1 in the form of mist. Water introduced into a vacuum tank 1 in this manner takes the form of micro-particles that can be rapidly degassed.

Each convergent nozzle 7 is connected to the storage tank 9 through a reverse flow preventing check-valve 22. In addition, each convergent nozzle 7 is connected to the water system through an inlet valve 23, a filter 24, and the main water valve 25. A convergent nozzle 7 supplies water to a vacuum tank 1 while maintaining the reduced pressure state of the vacuum tank 1. This is necessary because water cannot be degassed if the vacuum tank 1 is not kept in a state of reduced pressure. The quantity of gas dissolved in water is proportional to pressure. For example, although there is some variation with temperature, if pressure in the vacuum tank 1 is reduced to $1/10^{th}$ the atmospheric pressure, the quantity of gas dissolved in water is also reduced by approximately $1/10^{th}$. Water system tap water typically has a dissolved oxygen content of approximately 8 ppm. Accordingly, if pressure in the vacuum tank 1 is reduced to $1/10^{th}$ the atmospheric pressure, dissolved oxygen in the water is reduced below 1 ppm. The degree of vacuum attained in a vacuum tank 1 can be increased (to higher vacuum) by narrowing the convergent nozzle 7 flow passageway. However, the amount of water that can be introduced into the vacuum tank 1 is reduced as the size of the convergent nozzle 7 passageway is made smaller. Consequently, convergent nozzle 7 configuration is optimized according to the application considering the desired concentration of dissolved gas in the degassed liquid and the desired liquid processing capacity.

The degree of reduced pressure, namely the amount of vacuum attained in a vacuum tank 1 depends on the capability of the suction pump 6. The suction pump 6 is a high-lift pump, and in particular, vacuum tank 1 pressure reduction can be readily achieved if the suction pump 6 is a powerful high-lift type suction pump. A cascade pump is used as the suction pump 6. Since a cascade pump has high-lift capability, it has the characteristic that vacuum tank 1 pressure can be reduced to a low value. However, other pumps such as turbine pumps can also be used as the suction pump 6. A turbine pump achieves efficient extraction of water from a vacuum tank. A cascade or turbine pump can remove water by suction from a vacuum tank while reducing pressure inside the vacuum tank to $1/5^{th}$ to $1/20^{th}$ the atmospheric pressure. A water pump other than a cascade pump or turbine pump can also be used as the suction pump. In the degassing apparatus of the figures, a flow rate sensor 30 is connected to the outlet-side of the suction pump 6. The flow rate sensor 30 detects whether or not the suction pump 6 is discharging liquid normally. If the suction pump 6 malfunctions and does not discharge liquid normally, the flow rate sensor 30 detects that condition and suspends suction pump 6 operation. The flow rate sensor can also control suction pump operation to regulate the liquid flow rate through the pump. For example, the flow rate sensor can control the suction pump to discharge a constant liquid flow rate. A configuration where the flow rate sensor controls the suction pump to maintain a given flow rate is suitable for a degassing apparatus having a single vacuum tank.

The liquid supply mechanism 8 of the degassing apparatus shown in the figures is a liquid supply pump. When gas inside a vacuum tank 1 is being evacuated, the liquid supply pump supplies degassed liquid stored in the storage tank 9 to the vacuum tank 1. When degassed liquid is supplied by the liquid supply pump, the surface of liquid inside the vacuum tank 1 rises, and gas accumulated inside the tank is discharged. At this time, the liquid supply mechanism 8 continues operation until all the gas inside the vacuum tank 1 is completely evacuated. This is necessary because if there is residual gas in the vacuum tank 1 when the suction pump 6 removes liquid from the vacuum tank 1 to reduce tank pressure, that residual gas will expand and degrade degassing efficiency. In the degassing apparatus of the figures, a liquid supply pump is used to supply degassed liquid stored in the storage tank 9 to evacuate gas in a vacuum tank 1. Consequently, gas can be prevented from re-dissolving in the degassed liquid in the vacuum tank 1 during gas evacuation. However, storage tank degassed liquid can also be supplied to a vacuum tank without using a liquid supply pump by utilizing height (pressure head) difference and internal pressure difference between the storage tank and vacuum tank. Accordingly, the liquid supply mechanism does not necessarily have to be a pump. The storage tank itself can serve as the liquid supply mechanism. Further, the liquid supply mechanism can be any scheme that can supply water to a vacuum tank to evacuate all the gas accumulated inside.

For initially supplying water to the storage tank 9, the storage tank 9 is connected to the water system through a start-up valve 26, filter 24, and the main water valve 25. The storage tank 9 is also connected to each vacuum tank 1 through a reverse flow preventing check-valve 22. The check-valve 22 allows water to flow from the storage tank 9 to the vacuum tank 1 but does not allow flow in the reverse direction. The storage tank 9 is connected to a discharge pump 27 to deliver water stored in the storage tank 9 to the outside. The discharge pump 27 delivers storage tank 9 degassed water under pressure to locations external to the degassing apparatus.

The storage tank 9 is an airtight hermetically sealed tank that can store degassed liquid. The storage tank is larger than a vacuum tank. For example, the storage tank is more than three times the size of a vacuum tank, preferably more than five times the size of a vacuum tank, and optimally approximately ten times the size of a vacuum tank. A large storage tank is characterized by the ability to store a large quantity of degassed liquid and input vacuum tank liquid while maintaining reduced pressure. The hermetically sealed storage tank is required to input liquid from the vacuum tank while maintaining a state of reduced pressure. Accordingly, the storage tank must have space containing reduced pressure air that is larger than the internal volume of a vacuum tank. The hermetically sealed storage tank is provided with a "reduced pressure air layer" above the liquid surface. If liquid is supplied to the hermetically sealed storage tank to raise the level of the liquid surface and eliminate the air layer, supply of liquid from the vacuum tank to the storage tank becomes impossible. Consequently, it is necessary to input vacuum tank liquid while maintaining a layer of reduced pressure air inside the storage tank.

A reduced pressure retaining valve 33 is connected to the upper portion of the storage tank 9 to maintain a state of reduced pressure inside the storage tank 9. When liquid inside the storage tank is being forcibly discharged or when gas inside the storage tank is being evacuated by a vacuum pump 32, the degree of reduced pressure retaining valve 33 opening is controlled to maintain a given reduced pressure inside the storage tank.

When the discharge pump 27 is operated and the reduced pressure retaining valve 33 is closed, pressure inside the storage tank decreases. As the discharge pump forcibly withdraws liquid from the storage tank with the reduced pressure retaining valve 33 closed, the liquid surface level inside the storage tank drops and internal pressure decreases. As pressure inside the storage tank decreases, the amount of gas dissolving in liquid retained in the storage tank can be reduced, but both the flow rate of liquid from the storage tank sprayed into a vacuum tank through a convergent nozzle and the flow rate of liquid output outside the apparatus by the discharge pump decrease. Flow rate of liquid sprayed into a vacuum tank through a convergent nozzle decreases because the pressure difference between the storage tank and the vacuum tank decreases. The flow rate of liquid pumped outside the system by the discharge pump decreases because pressure on the suction-side of the discharge pump decreases. Accordingly, the degree of reduced pressure retaining valve 33 opening in controlled to adjust reduced pressure in the storage tank that allows liquid to be sprayed from a convergent nozzle into a vacuum tank and allows liquid to be discharged outside the degassing apparatus by discharge pump.

Minimum pressure in the reduced pressure storage tank is set from 0.01 MPa (1 MPa=$10^6$ Pa) to 0.03 MPa. However, the present invention does not specify minimum pressure in the storage tank to be within this range, rather a pressure range can be set that allows liquid to be sprayed into a vacuum tank through a convergent nozzle and also allows liquid to be discharged to the outside by the discharge pump. Increase in the amount of gas dissolved in liquid stored in the storage tank can be reduced by lowering minimum pressure during storage tank pressure reduction. Raising the minimum pressure allows the quantity of liquid sprayed through a convergent nozzle and the flow rate of liquid discharged to the outside by the discharge pump to be increased. Liquid supplied from a vacuum tank to the reduced pressure hermetically sealed storage tank raises pressure. This is because liquid level in the storage tank rises and the volume of air decreases compressing the air. Accordingly, at the start of liquid transfer from a vacuum tank to the storage tank, minimum pressure in the storage tank and the volume of air inside the storage tank are set to values that allow vacuum tank liquid to be supplied to the storage tank while maintaining a state of reduced pressure.

The storage tank in FIG. 2 is provided with a vacuum pump 32 that can forcibly evacuate storage tank gas through the reduced pressure retaining valve 33. A storage tank coupled with a vacuum pump 32 can evacuate air inside the storage tank during liquid transfer from a vacuum tank to the storage tank. Consequently, this apparatus can maintain a state of reduced pressure inside the storage tank by operating the vacuum pump 32 during the transfer of liquid into the storage tank.

The controller 10 controls each outlet valve 12, gas discharge valve 20, liquid supply valve 21, inlet valve 23, and the reduced pressure retaining valve 33 in the manner described below to store degassed liquid in the storage tank 9. Since the degassing apparatus in the figures is provided with two vacuum tanks 1, the vacuum tank 1 on the left-side is designated as the first vacuum tank 1A and the vacuum tank 1 on the right is designated as the second vacuum tank 1B. In addition, the outlet valve 12, gas discharge valve 20, liquid supply valve 21, inlet valve 23, and check-valve 22 connected to the first vacuum tank 1A are designated as the first outlet valve 12A, first gas discharge valve 20A, first liquid supply valve 21A, first inlet valve 23A, and first check-valve 22A. Similarly, the outlet valve 12, gas discharge valve 20, liquid supply valve 21, inlet valve 23, and check-valve 22 connected to the second vacuum tank 1B are designated as the second outlet valve 12B, second gas discharge valve 20B, second liquid supply valve 21B, second inlet valve 23B, and second check-valve 22B.

(1) Initial Start-up Procedure

The main water valve 25 is opened and each outlet valve 12, liquid supply valve 21, and inlet valve 23 is closed. In this state, when the start-up valve 26, reduced pressure retaining valve 33, and each gas discharge valve 20 are opened, tap waters moves through the flow path: main water valve 25→filter 24→start-up valve 26→storage tank 9→each vacuum tank 1. When water is supplied through this flow path, both vacuum tanks 1 initially completely fill with water. When a vacuum tank 1 completely fills with water, water is discharged from the gas discharge opening 15. When liquid is discharged from a gas discharge opening 15, that condition is detected by the liquid sensor 19. The liquid sensor 19 signal is input to the controller 10 and the controller 10 closes the related gas discharge valve 20. When the surface of liquid in the storage tank 9 reaches the maximum level, the start-up valve 26 and reduced pressure retaining valve 33 are closed. The amount of water in the storage tank 9 is detected by a liquid level sensor 28 provided on the storage tank 9. The maximum level of liquid in the storage tank is set to a level that establishes an air pocket in the upper portion of the storage tank.

Subsequently, the discharge pump 27 is operated with the reduced pressure retaining valve 33 closed to remove liquid from the storage tank and lower the liquid level to a set level while reducing pressure. During this operation, the reduced pressure retaining valve 33 is controlled to adjust storage tank internal pressure to the minimum value when storage tank liquid level drops to the set level.

If the vacuum tanks 1 are not completely filled with water when water in the storage tank 9 rises to the maximum level, the liquid supply mechanism 8 can be operated with the reduced pressure retaining valve 33 closed to supply storage tank 9 water to the vacuum tanks 1A, 1B (through liquid supply valves 21A, 21B) while reducing pressure in the storage tank. Since the liquid supply mechanism 8 supplies storage tank 9 water to the vacuum tanks 1A, 1B without passing it through the convergent nozzles 7A, 7B, water can be supplied quickly. When water is supplied to the vacuum tanks 1A, 1B in this manner, the gas discharge openings 15 discharge water when the vacuum tanks 1A, 1B become completely full. In this case as well, the liquid sensors 19 detect the discharge of liquid from the gas discharge openings 15, and the controller 10 closes the gas discharge valves 20. Liquid supply mechanism 8 operation is stopped when both vacuum tanks 1A, 1B have been completely filled. At this point, storage tank liquid has been discharged and storage tank pressure has been reduced. Pressure in the storage tank can be further reduced by operating the vacuum pump 32. In addition, a degassing apparatus having a vacuum pump 32 connected to the storage tank can open the reduced pressure retaining valve 33 and operate the vacuum pump 32 to reduce storage tank internal pressure to the minimum pressure after liquid has been supplied to fill the storage tank to the set level.

(2) First Vacuum Tank Degassing Process

The suction pump 6 is operated with the first gas discharge valve 20A and the reduced pressure retaining valve 33 closed. As shown by the arrows in FIG. 3, the suction pump 6 circulates water around the flow path: storage tank 9→first check-valve 22A→first convergent nozzle 7A→first vacuum tank 1A→first outlet valve 12A→suction pump 6→storage tank 9. The valves in this flow path are opened to circulate water in this manner. Other valves that do not circulate water, namely, the second inlet valve 23B, the second liquid supply valve 21B, and the second outlet valve 12B are closed. Under these conditions, water in the reduced pressure storage tank 9 is circulated through the first vacuum tank 1A and degassed in the vacuum of the first vacuum tank 1A. If storage tank pressure drops and liquid cannot be supplied from the convergent nozzle to the vacuum tank or if the quantity of liquid sprayed from the convergent nozzle drops below a set value, the reduced pressure retaining valve 33 can be opened and adjusted to raise the reduced pressure in the storage tank to a pressure that can spray liquid through the convergent nozzle. After some time with water circulating between the storage tank 9 and the first vacuum tank 1A to degas liquid, the level of liquid in the vacuum tank drops to the level of the liquid surface sensor 14, and the liquid surface sensor 14 sends a signal to the controller 10. When the controller 10 receives the liquid surface sensor 14 signal, it closes the first outlet valve 12A and suspends water circulation between the first vacuum tank 1A and the storage tank 9.

(3) Discharge of Gas Accumulated in the First Vacuum Tank and Second Vacuum Tank Degassing Process The liquid supply mechanism 8, which is a liquid supply pump, is operated with the first outlet valve 12A closed, and first gas discharge valve 20A and first liquid supply valve 21A open. This supplies degassed liquid retained in the storage tank 9 to the first vacuum tank 1A. During this process, the reduced pressure retaining valve 33 can be closed to reduce pressure in the storage tank, or storage tank pressure can be regulated by opening and adjusting the reduced pressure retaining valve 33. Degassed liquid is supplied to the first vacuum tank 1A and the liquid surface level rises discharging gas accumulated in the upper portion of the tank (to the outside) through the first gas discharge valve 20A. When gas has been completely discharged from the first vacuum tank 1A, water is discharged from the first gas discharge valve 20A. Liquid discharge from the gas discharge opening 15 is detected by the liquid sensor 19. On receiving the liquid sensor 19 signal, the controller 10 closes the first gas discharge valve 20A and the first liquid supply valve 21A. At this point, gas has been completely discharged from the first vacuum tank 1A.

Figure 4:
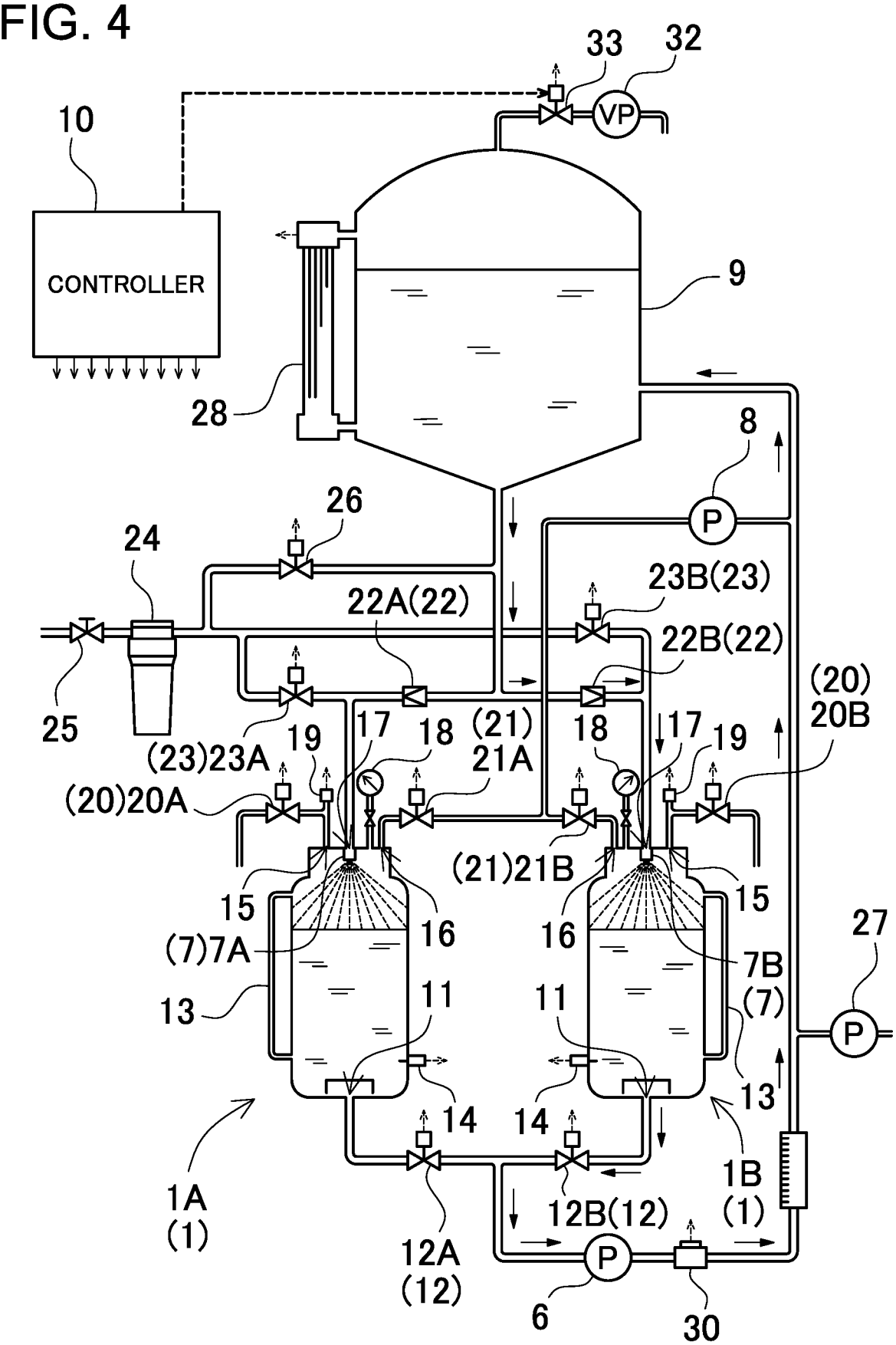
FIG. 4 is a schematic diagram partially in cross-section showing gas removal using the second vacuum tank of the degassing apparatus shown in FIG. 2.

While the above operation is being conducted, the second gas discharge valve 20B and the reduced pressure retaining valve 33 are closed. Further, as shown by the arrows in FIG. 4, the suction pump 6 circulates water around the flow path: storage tank 9→second check-valve 22B→second convergent nozzle 7B→second vacuum tank 1B→second outlet valve 12B→suction pump 6→storage tank 9. The valves in this flow path are opened to circulate water in this manner. Under these conditions, storage tank 9 water is circulated through the second vacuum tank 1B and degassed in the vacuum of the second vacuum tank 1B. Gas removed from the water accumulates in the second vacuum tank 1B. After some time with water circulating between the storage tank 9 and the second vacuum tank 1B to degas liquid, the level of liquid in the vacuum tank drops to the level of the liquid surface sensor 14, and the liquid surface sensor 14 sends a signal to the controller 10. When the controller 10 receives the liquid surface sensor 14 signal, it closes the second outlet valve 12B and suspends water circulation between the second vacuum tank 1B and the storage tank 9.

(4) Discharge of Gas Accumulated in the Second Vacuum Tank and First Vacuum Tank Degassing Process The liquid supply mechanism 8, which is a liquid supply pump, is operated with the second outlet valve 12B closed, and the second gas discharge valve 20B and second liquid supply valve 21B open. The liquid supply pump supplies degassed liquid retained in the storage tank 9 to the second vacuum tank 1B. As degassed liquid is supplied to the second vacuum tank 1B, the liquid surface level rises discharging gas accumulated in the upper portion of the tank (to the outside) through the second gas discharge valve 20B. When gas has been completely discharged from the second vacuum tank 1B, water is discharged from the second gas discharge valve 20B. Liquid discharge from the gas discharge opening 15 is detected by the liquid sensor 19. On receiving the liquid sensor 19 signal, the controller 10 closes the second gas discharge valve 20B and the second liquid supply valve 21B. At this point, gas has been completely discharged from the second vacuum tank 1B.

Figure 3:
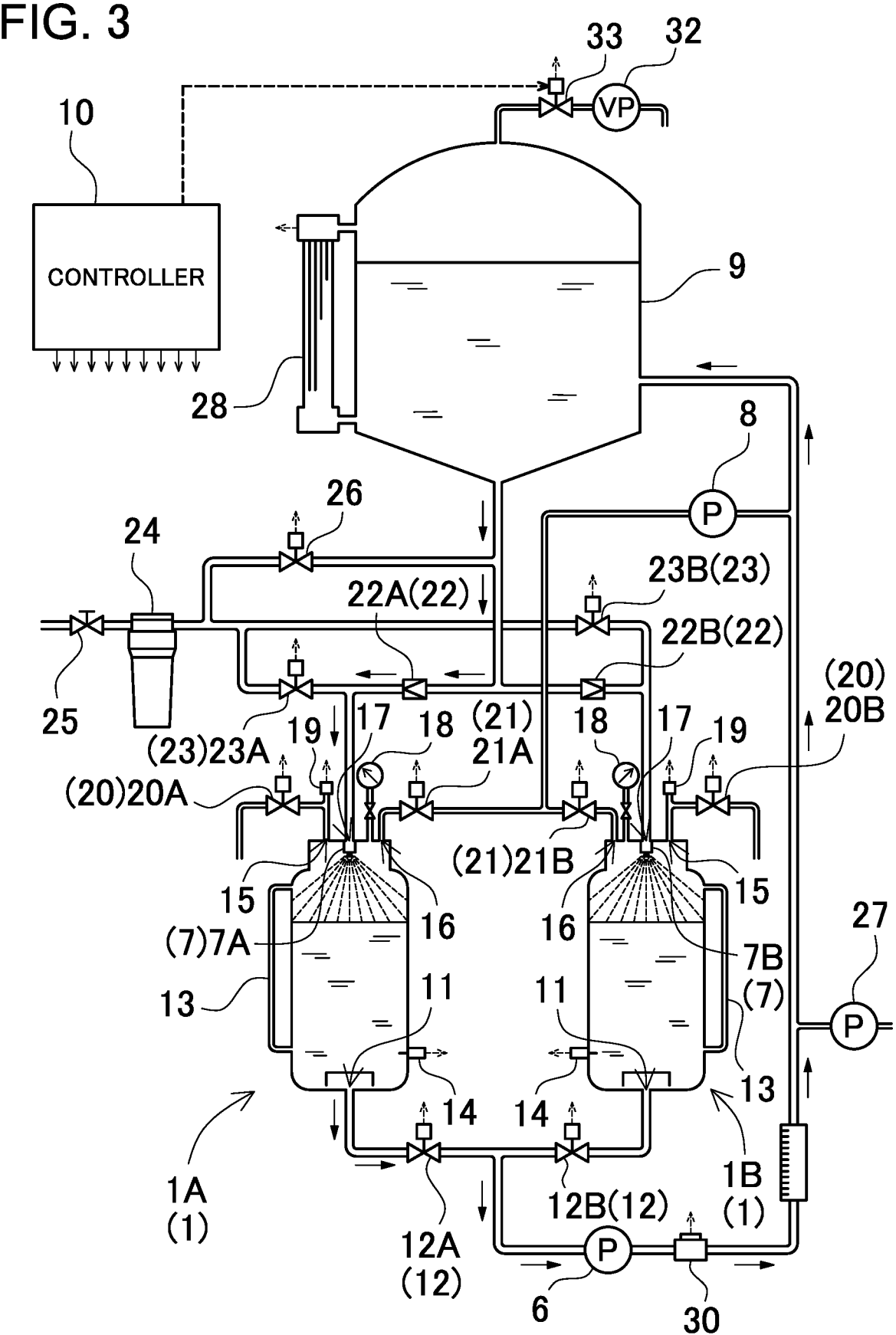
FIG. 3 is a schematic diagram partially in cross-section showing gas removal using the first vacuum tank of the degassing apparatus shown in FIG. 2.

While the above operation is being conducted, the first gas discharge valve 20A is closed, and as shown by the arrows in FIG. 3, the suction pump 6 circulates water around the flow path: storage tank 9→first check-valve 22A→first convergent nozzle 7A→first vacuum tank 1A→first outlet valve 12A→suction pump 6→storage tank 9. The valves in this flow path are opened to circulate water in this manner. Under these conditions, storage tank 9 water is circulated through the first vacuum tank 1A and degassed in the vacuum of the first vacuum tank 1A. Gas removed from the water accumulates in the first vacuum tank 1A. After some time with water circulating between the storage tank 9 and the first vacuum tank 1A, the level of liquid in the vacuum tank drops to the level of the liquid surface sensor 14, and the first outlet valve 12A is closed.

Subsequently, operations described in steps (3) and (4) above are repeated to accumulate degassed liquid in the storage tank 9. This sequence alternately opens and closes the first outlet valve 12A and the second outlet valve 12B, circulates storage tank 9 water through either the first vacuum tank 1A or the second vacuum tank 1B, and can remove gas from water in a continuous manner. Further, since gas can be removed from water in one of the vacuum tanks 1 at the same time accumulated gas is being removed from the other vacuum tank 1, water can be degassed with overall efficiency.

To use the degassed liquid, the discharge pump 27 is operated. The discharge pump 27 delivers degassed liquid held in the storage tank 9 under pressure to the outside. When degassed liquid is discharged and the level of liquid in the storage tank 9 drops, the inlet valve 23 connected to the vacuum tank 1 circulating storage tank 9 degassed liquid is opened and tap water is input through the inlet valve 23 into the vacuum tank 1 for degassing. Here, suction pump 6 operation supplies vacuum tank liquid to the storage tank. Under these conditions, liquid is discharged from the storage tank by the discharge pump and liquid is supplied to the storage tank by the suction pump. If discharge pump flow rate is greater than suction pump flow rate, the amount of liquid flowing out of the storage tank exceeds the amount flowing in, and the level of liquid decreases gradually reducing storage tank pressure. Storage tank pressure reduction can be regulated by adjusting the degree of reduced pressure retaining valve 33 opening. Storage tank pressure is controlled to a pressure that allows the suction pump to spray liquid from the convergent nozzle into the vacuum tank. Conversely, if suction pump flow rate is greater than discharge pump flow rate, the level of storage tank liquid gradually increases and the reduced internal pressure rises. In this case, either the vacuum pump 32 is operated to forcibly evacuate air inside the storage tank, or suction pump operation is temporarily suspended to maintain a state of reduced pressure inside the storage tank.

The degassing apparatus of the present invention does not necessarily need to be provided with a plurality of vacuum tanks. Degassed liquid can also be obtained by repeatedly executing the degassing process step and the gas discharge step in a single vacuum tank. In either case, since the apparatus shown in the figures circulates degassed liquid between the storage tank 9 and the vacuum tank(s) 1, gas concentration in degassed liquid accumulated in the storage tank 9 can be made significantly low.

Figure 5:
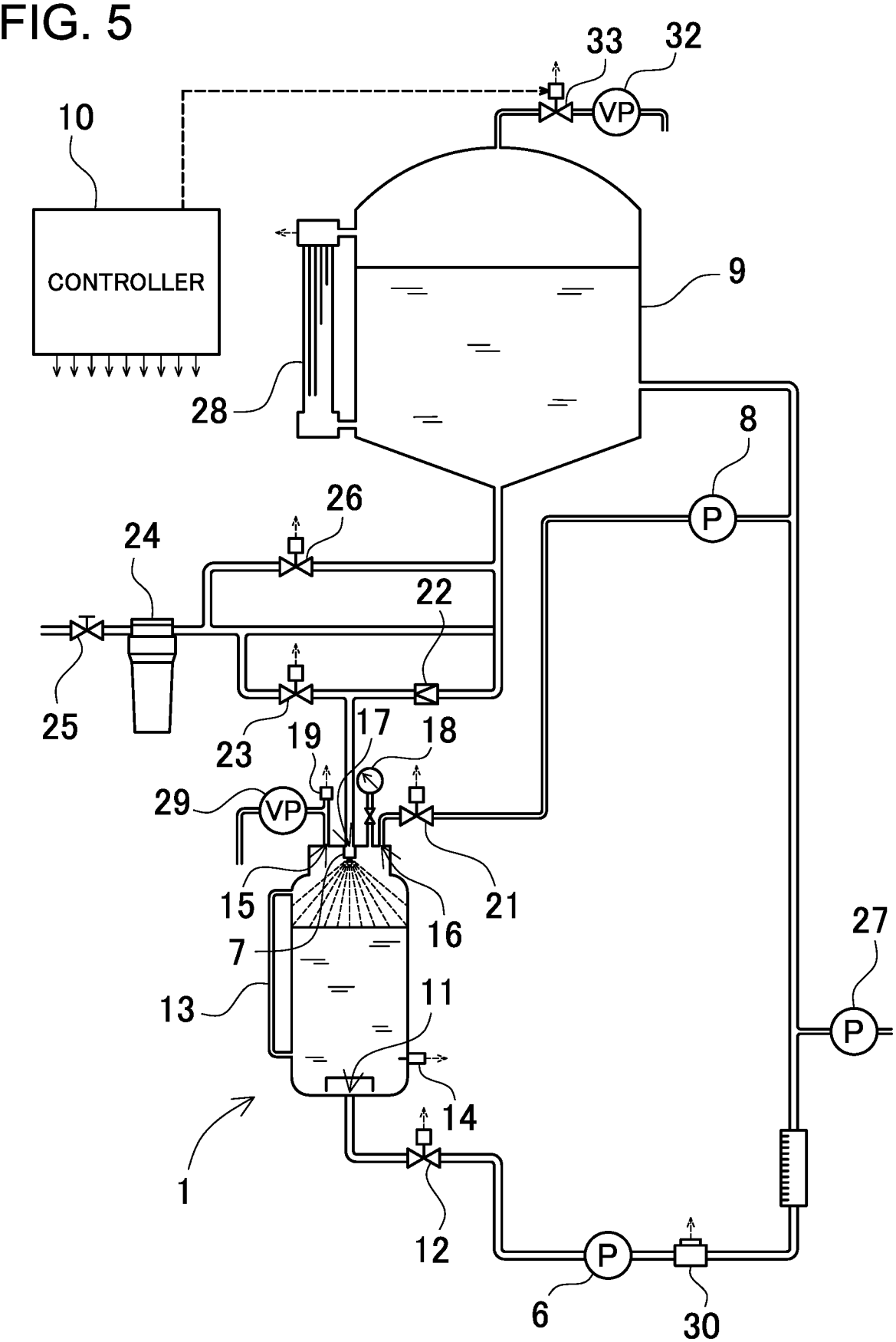
FIG. 5 is a schematic diagram partially in cross-section showing a degassing apparatus for another embodiment of the present invention.
Figure 6:
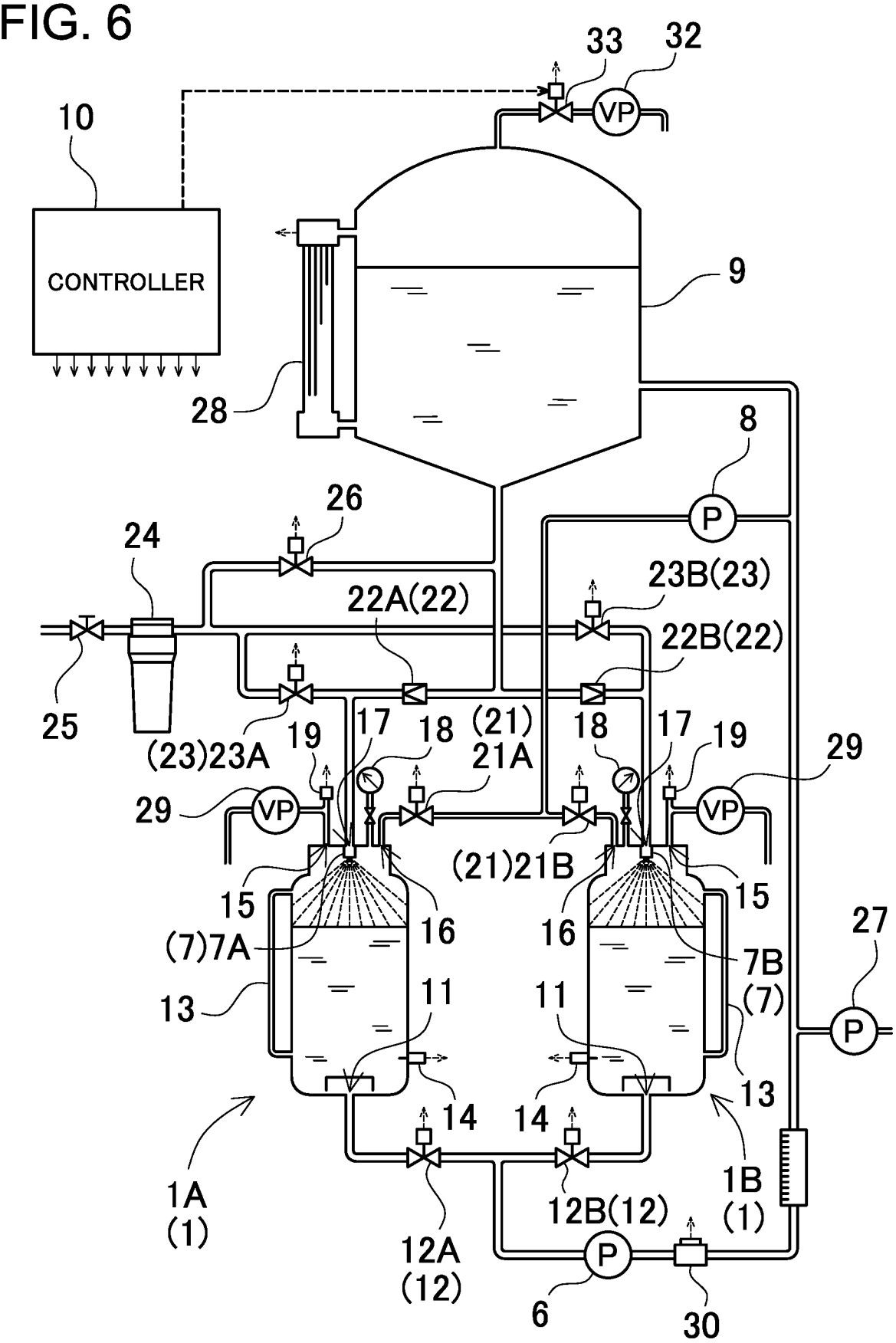
FIG. 6 is a schematic diagram partially in cross-section showing a degassing apparatus for still another embodiment of the present invention.

As shown in FIGS. 5 and 6, the degassing apparatus of the present invention can also be configured with a vacuum pump 29 connected to each vacuum tank 1. Since gas accumulated in the vacuum tank 1 of a degassing apparatus with this configuration can be evacuated by the vacuum pump 29, a liquid supply mechanism to discharge gas accumulated in the vacuum tank 1 can be excluded. However, as shown in the figures, a liquid supply mechanism 8 provided with the storage tank 9 allows storage tank 9 water to be supplied to the vacuum tank 1 to quickly fill the vacuum tank 1 with water during initial start-up.

As shown in FIG. 5, an apparatus that evacuates vacuum tank 1 gas with a vacuum pump 29 can degas liquid in an uninterrupted manner with a single vacuum tank 1. Accordingly, gas can be efficiently removed from liquid with a single vacuum tank 1. As shown in FIG. 6, a plurality of vacuum tanks 1 (coupled with vacuum pumps 29) can also be linked and alternately operated to degas liquid. In a degassing apparatus provided with a plurality of vacuum tanks 1 as shown in FIG. 6, one of the vacuum tanks 1 in a state of vacuum can be supplied with water for degassing while accumulated gas in the other vacuum tank 1 can be evacuated with the vacuum pump 29.

Vacuum pump 29 operation is controlled by the controller 10. The controller 10 controls vacuum pump 29 operation based on signals from the liquid sensor 19 and the liquid surface sensor 14. The controller operates the vacuum pump 29 when liquid level in the vacuum tank 1 is between the levels of the liquid surface sensor 14 and the liquid sensor 19. When a vacuum pump 29 discharges vacuum tank 1 gas and liquid flows into the location of the liquid sensor 19, vacuum pump 29 operation is stopped. After stopping the vacuum pump 29, when liquid level in the vacuum tank 1 drops to the level of the liquid surface sensor 14, the controller 10 resumes vacuum pump 29 operation.

The following describes operation of the degassing apparatus shown in FIG. 5.

(1) Initial Start-up Procedure

The main water valve 25 and the reduced pressure retaining valve 33 are opened and the outlet valve 12, liquid supply valve 21, and inlet valve 23 are closed. In this state, when the vacuum pump 29 is operated and the start-up valve 26 is opened, tap waters ingresses through the flow path: main water valve 25→filter 24→start-up valve 26→storage tank 9→vacuum tank 1. Water supplied through this flow path fills the vacuum tank 1 with water. When water completely fills the vacuum tank 1, the liquid sensor 19 detects that condition. The liquid sensor 19 signal is input to the controller 10, and the controller 10 suspends vacuum pump 29 operation. When the surface of liquid in the storage tank 9 reaches the set level, the start-up valve 26 is closed. The quantity of water in the storage tank 9 is detected by the liquid level sensor 28 provided on the storage tank 9.

If the amount of water in the storage tank 9 reaches the set level before the vacuum tank 1 is completely filled with water, the liquid supply mechanism 8 can be operated to supply storage tank 9 water to the vacuum tank 1. Since the liquid supply mechanism 8 supplies storage tank 9 water to the vacuum tank 1 without passing it through the convergent nozzle 7, water can be supplied quickly. Subsequently, the vacuum pump 32 connected to the storage tank is operated, or the discharge pump 27 is operated after closing the reduced pressure retaining valve 33 to remove storage tank liquid and reduce internal pressure.

(2) Vacuum Tank Degassing Process

The suction pump 6 is operated while keeping the reduced pressure retaining valve 33 closed to forcibly remove water from the vacuum tank 1 and circulate it through the storage tank 9. This procedure circulates water around the flow path: storage tank 9→check-valve 22→convergent nozzle 7→vacuum tank 1→outlet valve 12→suction pump 6→storage tank 9. Valves in this flow path are opened to circulate water in this manner. Under these conditions, storage tank 9 water is circulated through the vacuum tank 1 and degassed in the vacuum of the vacuum tank 1. Gas removed from the water is evacuated by the vacuum pump 29. which is operated during gas removal from the vacuum tank. When vacuum pump 29 performance (capability) allows complete evacuation of gas accumulated in the vacuum tank 1, the vacuum pump 29 is controlled by the controller 10 to operate intermittently based on liquid sensor 19 and liquid surface sensor 14 signals. When vacuum pump 29 performance does not enable complete removal of gas accumulated in the vacuum tank 1, the level of liquid in the vacuum tank 1 gradually drops even as the vacuum pump 29 is operated. When liquid in the vacuum tank 1 drops to the level of the liquid surface sensor 14 with the vacuum pump 29 operating, the liquid surface sensor 14 sends a signal to the controller 10. The controller 10 closes the outlet valve 12 and suspends suction pump 6 operation to discontinue water circulation between the vacuum tank 1 and storage tank 9. When the level of liquid in the vacuum tank 1 rises and that condition is detected by the liquid surface sensor 14, suction pump 6 liquid removal from the vacuum tank 1 is resumed. In this case as well, vacuum pump 29 operation is suspended when the level of liquid in the vacuum tank 1 rises above the liquid sensor 19, and operation is resumed when the level of liquid drops below the liquid surface sensor 14.

Still further, as shown in FIG. 6, the degassing apparatus can link two vacuum tanks each having a vacuum pump. For example, when liquid level in the first vacuum tank 1A drops, this degassing apparatus switches suction pump 6 operation from the first vacuum tank 1A to the second vacuum tank 1B. When the suction pump 6 is not removing liquid from the first vacuum tank 1A, the vacuum pump 29 connected to the first vacuum tank 1A is operated until gas is completely removed from the first vacuum tank 1A. When liquid level in the second vacuum tank 1B drops due to liquid removal by the suction pump 6, operation is switched from the second vacuum tank back to the first vacuum tank. Here, the vacuum pump 29 connected to the second vacuum tank 1B is operated until gas is completely removed from that vacuum tank. Subsequently, this sequence is repeated to remove dissolved gas from the liquid.

The degassing apparatus described above switches a single suction pump between two vacuum tanks to alternately remove liquid from both vacuum tanks. However, although not illustrated in the figures, a separate suction pump can also be connected to each vacuum tank and liquid can be removed from a vacuum tank by its own dedicated suction pump.

Although the liquid sensors and liquid surface sensors shown in the figures detect liquid level via electrodes, these sensors can also detect liquid level by other means such as ultrasonic or float mechanisms.

Incidentally, liquid degassing efficiency can be improved by heating the liquid. The apparatus shown in FIG. 2 is equipped with a heater 31 connected to the water system input. The heater 31 can be any device capable of heating liquid such as a boiler. It is also possible to connect the heater to the input-side of the vacuum tanks. Liquid heated by the heater is efficiently degassed in the reduced pressure interior of a vacuum tank.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims.

The invention claimed is:

1. A degassing apparatus comprising:
   vacuum tanks;
   a suction pump connected to the vacuum tanks for withdrawing liquid and reducing vacuum tank pressure;
   a storage tank connected to an outlet-side of the suction pump so as to be supplied with liquid from the vacuum tanks;
   a vacuum pump connected to the storage tank; and
   convergent nozzles connected to the storage tank for spraying storage tank liquid into each of the vacuum tanks while maintaining reduced pressure inside the vacuum tanks,
   wherein liquid is degassed inside the vacuum tanks, degassed liquid is stored in the storage tank, and storage tank liquid is supplied to the vacuum tanks through the convergent nozzles,
   wherein the storage tank is a hermetically sealed tank and comprises reduced pressure retaining valve that discharges gas accumulated inside the storage tank, and
   wherein a reduced pressure air layer is formed above the liquid surface in the storage tank by the vacuum pump.

2. The degassing apparatus as cited in claim 1, wherein a vacuum pump is connected to each of the vacuum tanks to evacuate gas from inside the vacuum tanks.

3. The degassing apparatus as cited in claim 1, wherein the vacuum pump is connected to forcibly discharge gas inside the storage tank through the reduced pressure retaining valve.

4. The degassing apparatus as cited in claim 1, wherein the reduced pressure retaining valve establishes minimum pressure in the storage tank in a range of 0.01 MPa and 0.03 MPa.

5. The degassing apparatus as cited in claim 1, wherein the reduced pressure retaining valve is connected to an upper portion of the storage tank.

6. The degassing apparatus as cited in claim 1, wherein a degree of reduced pressure retaining valve opening is regulated during forced discharge of liquid from inside the storage tank and during vacuum pump discharge of gas from inside the storage tank to maintain a given state of reduced pressure inside the storage tank.

7. A degassing apparatus comprising:
   at least one vacuum tank;
   a suction pump connected to the at least one vacuum tank for withdrawing liquid and reducing vacuum tank pressure;
   a storage tank connected to an outlet-side of the suction pump so as to be supplied with liquid from the at least one vacuum tank;
   a vacuum pump connected to the storage tank; and
   a convergent nozzle connected to the storage tank for spraying storage tank liquid into the at least one vacuum tank while maintaining reduced pressure inside the vacuum tank,
   wherein liquid is degassed inside the at least one vacuum tank, degassed liquid is stored in the storage tank, and storage tank liquid is supplied to the vacuum tank through the convergent nozzle,
   wherein the storage tank is a hermetically sealed tank and comprises a reduced pressure retaining valve that discharges gas accumulated inside the storage tank, and
   wherein a reduced pressure air layer is formed above the liquid surface in the storage tank by the vacuum pump.

8. The degassing apparatus as cited in claim 7, wherein a vacuum pump is connected to the at least one vacuum tank to evacuate gas from inside the vacuum tank.

9. The degassing apparatus as cited in claim 7, wherein the vacuum pump is connected to forcibly discharge gas from inside the storage tank through the reduced pressure retaining valve.

10. The degassing apparatus as cited in claim 7, wherein the reduced pressure retaining valve establishes minimum pressure in the storage tank in a range of 0.01 MPa and 0.03 MPa.

11. The degassing apparatus as cited in claim 7, wherein the reduced pressure retaining valve is connected to an upper portion of the storage tank.

12. The degassing apparatus as cited in claim 7, wherein the vacuum pump is connected to forcibly discharge gas from inside the storage tank through the reduced pressure retaining valve, and
   wherein a degree of reduced pressure retaining valve opening is regulated during forced discharge of liquid from inside the storage tank and during vacuum pump discharge of gas from inside the storage tank to maintain a given state of reduced pressure inside the storage tank.

13. The degassing apparatus as cited in claim 1, wherein the vacuum pump is operable to evacuate gas from the storage tank during liquid transfer from the at least one vacuum tank to the storage tank to maintain a state of reduced pressure inside the storage tank.

* * * * *